US010764627B2

(12) United States Patent
Naik (10) Patent No.: US 10,764,627 B2
(45) Date of Patent: Sep. 1, 2020

(54) SYSTEM FOR DEPLOYMENT OF VALUE-ADDED SERVICES OVER DIGITAL BROADCAST CABLE

(71) Applicant: Atul Madhavrao Naik, Maharashtra (IN)

(72) Inventor: Atul Madhavrao Naik, Maharashtra (IN)

(*) Notice: Subject to any disclaimer, the term of this patent is extended or adjusted under 35 U.S.C. 154(b) by 36 days.

(21) Appl. No.: 14/761,616

(22) PCT Filed: Jun. 17, 2014

(86) PCT No.: PCT/IN2014/000402
§ 371 (c)(1),
(2) Date: Jul. 16, 2015

(87) PCT Pub. No.: WO2015/075729
PCT Pub. Date: May 28, 2015

(65) Prior Publication Data
US 2015/0373391 A1    Dec. 24, 2015

(30) Foreign Application Priority Data
Nov. 20, 2013  (IN) .......................... 3650/MUM/2013

(51) Int. Cl.
*H04N 21/61*    (2011.01)
*H04N 21/426*   (2011.01)
(Continued)

(52) U.S. Cl.
CPC ......... *H04N 21/426* (2013.01); *H04N 21/437* (2013.01); *H04N 21/4382* (2013.01);
(Continued)

(58) Field of Classification Search
CPC .... H04N 21/426; H04N 21/61; H04N 21/438; H04N 21/643; H04N 21/436; H04N 21/437; H04N 21/4788; H04N 21/4363
See application file for complete search history.

(56) References Cited

U.S. PATENT DOCUMENTS 5,675,575 A   10/1997  Wall, Jr. et al.
7,337,464 B2   2/2008  Bogot
(Continued)

FOREIGN PATENT DOCUMENTS

WO   WO-2008/065413 A1   6/2008
WO   WO-2012/032193 A1   3/2012

*Primary Examiner* — Junior O Mendoza
(74) *Attorney, Agent, or Firm* — D'Ambrosio & Menon, PLLC; Usha Menon (57) ABSTRACT

A cable set-top box and cable distribution system architecture for deployment of value-added services over digital video broadcasting-cable is disclosed. A consumer can request for an on-demand service or a data at the cable set-top box system 122, where the request may be executed by extracting data from storage means provided in the cable set-top box, and/or the request may be forwarded via a wireless data modem to a telecommunication network where the source of the request is identified and routed to a corresponding cable headend 106 for execution through the DVB-C and/or the modem, and/or the request may be forwarded by the modem via the telecommunication network to a computing cloud 130 where the source of the request is identified and routed to the corresponding cable headend 106 for execution through the DVB-C and/or the modem.

11 Claims, 5 Drawing Sheets

(51) Int. Cl.
  *H04N 21/437* (2011.01)
  *H04N 21/4363* (2011.01)
  *H04N 21/436* (2011.01)
  *H04N 21/438* (2011.01)
  *H04N 21/4788* (2011.01)
  *H04N 21/643* (2011.01)

(52) U.S. Cl.
  CPC . *H04N 21/43615* (2013.01); *H04N 21/43632* (2013.01); *H04N 21/43635* (2013.01); *H04N 21/43637* (2013.01); *H04N 21/4788* (2013.01); *H04N 21/6118* (2013.01); *H04N 21/6125* (2013.01); *H04N 21/6168* (2013.01); *H04N 21/6175* (2013.01); *H04N 21/64322* (2013.01)

(56) References Cited

U.S. PATENT DOCUMENTS

| | | | |
|---|---|---|---|
| 7,386,879 B1* | 6/2008 | Van Willigen | H04N 7/165 348/E7.063 |
| 8,332,901 B2* | 12/2012 | Mangione | H04N 7/17309 370/354 |
| 2002/0026646 A1* | 2/2002 | Hoang | H04N 7/17318 725/134 |
| 2002/0069406 A1* | 6/2002 | Aaltonen | H04H 20/24 725/34 |
| 2003/0004961 A1* | 1/2003 | Slothouber | G06F 9/445 |
| 2003/0086696 A1 | 5/2003 | Adolph et al. | |
| 2003/0115612 A1 | 6/2003 | Mao et al. | |
| 2003/0196211 A1* | 10/2003 | Chan | H04N 21/234363 725/131 |
| 2003/0200548 A1* | 10/2003 | Baran | H04L 29/06027 725/90 |
| 2004/0181800 A1* | 9/2004 | Rakib | H04L 63/062 725/25 |
| 2004/0218606 A1* | 11/2004 | Leatherbury | H04N 21/6118 370/395.5 |
| 2005/0055723 A1* | 3/2005 | Atad | H04H 40/90 725/80 |
| 2005/0055729 A1* | 3/2005 | Atad | H04H 40/90 725/118 |
| 2005/0114899 A1 | 5/2005 | Shih et al. | |
| 2005/0132295 A1* | 6/2005 | Noll | G06Q 30/02 715/744 |
| 2007/0258701 A1* | 11/2007 | Lee | H04N 21/235 386/230 |
| 2008/0098450 A1* | 4/2008 | Wu | H04N 21/4312 725/132 |
| 2008/0120667 A1* | 5/2008 | Zaltsman | H04L 12/2856 725/110 |
| 2008/0192736 A1 | 8/2008 | Jabri et al. | |
| 2009/0025027 A1* | 1/2009 | Craner | H04H 20/103 725/32 |
| 2009/0138459 A1* | 5/2009 | Walter | H04N 21/4828 |
| 2009/0222851 A1* | 9/2009 | Talmi | H04N 7/17336 725/32 |
| 2011/0016499 A1* | 1/2011 | Liu | H04N 21/6118 725/98 |
| 2011/0055873 A1* | 3/2011 | Heo | G06F 3/0236 725/52 |
| 2011/0107379 A1* | 5/2011 | Lajoie | H04L 65/4076 725/87 |
| 2011/0141218 A1* | 6/2011 | Stancato | G06F 21/10 348/14.01 |
| 2012/0096499 A1* | 4/2012 | Dasher | H04N 21/4223 725/87 |
| 2012/0131447 A1 | 5/2012 | Park et al. | |
| 2012/0159538 A1* | 6/2012 | Phillips | H04N 21/2221 725/34 |
| 2013/0024383 A1 | 1/2013 | Kannappan | |
| 2013/0107131 A1* | 5/2013 | Barnett | G08C 17/02 348/734 |
| 2013/0268437 A1 | 10/2013 | Desai et al. | |
| 2013/0268761 A1* | 10/2013 | Giladi | H04L 9/32 713/170 |
| 2014/0046848 A1* | 2/2014 | Radu | G06Q 20/40 705/44 |
| 2014/0310599 A1* | 10/2014 | Clift | H04N 21/4126 715/719 |
| 2015/0095936 A1* | 4/2015 | Yu | H04N 21/6181 725/28 |
| 2015/0172739 A1* | 6/2015 | Shaw | H04N 21/25816 725/31 |
| 2016/0037216 A1* | 2/2016 | Hicks | H04N 21/4122 725/8 |

\* cited by examiner

SYSTEM FOR DEPLOYMENT OF VALUE-ADDED SERVICES OVER DIGITAL BROADCAST CABLE

FIELD OF THE INVENTION

The present invention relates to a cable set-top box (STB) and home gateway device system.

More particularly, the present invention relates to a cable STB system/home gateway system for deployment of value-added services over digital cable broadcast.

BACKGROUND OF THE INVENTION

A broadcast network makes available the content to multiple consumers, typically in synchronous fashion, without being specifically addressed to individual user equipment devices in point-to-point fashion. Examples of broadcast networks include cable and satellite television networks, satellite radio networks, IP networks used for multicasting content and networks used for podcasts or telephony broadcasts/multicasts. The content may also be broadcasted over the airwaves. The content may be consumed by the users in real-time or on a time-shifted basis (e.g., recorded for later playback).

Broadcast network content often includes programming content and informational content. For example, in the case of a television network, the programming content may include news programs, serial television programs, movies, paid programming or other content. The informational content may include advertisements, public service announcements, ad tags, trailers, crawls, weather or emergency notifications and a variety of other content, including both paid and unpaid content.

The broadcast network typically communicates broadband signals and/or other signals to the consumers. In conventional systems, a signal is communicated from a network to a set-top box (STB) located at a consumer's household. The signal is then processed by the STB in order to format data for presentation of the content on the consumer television or other display device enabled with DVB-C reception. The signal source may come from a satellite dish, a coaxial cable (cable television), or a UHF/VHF antenna. Many conventional systems utilize digital video recorders ("DVRs") to facilitate the recording of the broadband content at the consumer's direction. The conventional DVRs are typically situated within the STB at the consumer's household.

Several efforts have been made in the past to develop STBs adapted to provide value-added services.

WO2008065413 discloses a state-of-art set-top box. The set-top box of WO2008065413 has an electronic program guide and includes means for connecting to the internet for receiving programs and/or data by way of a predetermined website. The means are adapted to receive free view, free satellite channels, pay-per-views channels, and programs from video-on-demand channels provided by way of the internet. The video-on-demand channels may also be accessed from an electronic program guide following input by a user of a personal identification (PIN) number.

WO2012032193 discloses another state-of-art set-top box. The set-top box of WO2012032193 is adapted to decode received media content and provide the media content to a display. The set-top box comprises a communication module for receiving instructions from a remote user over a communication channel and an emulator for emulating the receipt of at least one command at the remote control interface in response to the receipt of an instruction from a remote user by the communications module to issue the at least one command. The set-top box further comprises a video module in which received media content is formatted into the video component of a TV signal, and an image capturing block for capturing at least one image from the video module and transmitting this captured image to the remote user through the communication module, wherein the video module is adapted to provide On Screen Display (OSD) information within the video component.

US Application No. 20050114899 discloses yet another state-of-art digital set-top box which comprises a tuner for receiving a digital broadcasting signal and generating a digital data stream; a demultiplexer for receiving said digital data stream and generating a digital video signal; a MPEG-2 decoder for receiving said digital video signal and generating an interlaced digital video signal; a deinterlace video processor for receiving said interlaced digital video signal and generating a digital RGB signal; wherein said digital video signal can be transmitted to a display via a DVI interface for a user to be watched on said display; and a microprocessor connected to said tuner, said demultiplexer, said MPEG-2 decoder and said deinterlace video processor, for transmitting related data signal to each unit and controlling an operation of each unit.

U.S. Pat. No. 7,337,464 discloses a state-of-art broadcasting system comprising a transmitter for transmitting a signal in a first transmission format; a receiver for receiving said signal; a reformatter for reformatting said received signal into a second transmission format; and a set-top box (STB) for decoding said second-transmission-formatted signal; wherein said STB is further adapted to enter a program identifier (PID) corresponding to a selected program and to provide the PID to said reformatter, and said reformatter is further adapted to receive the PID from the STB and to reformat the signal into the second transmission format based on the determination of a conditional access module.

In the known conventional STB systems the communication/distribution network is purely one-way. That is, the consumers have to watch only the content which is being multi-cast by the service provider. The consumer, at his end, cannot establish a communication between the television set and the service provider through the STB, to request a service or content and receive such specific service or content thereof.

Also, with the increased use of additional types of devices that may be configured to receive the content, such as tablets, mobile devices, and/or personal computers, a service provider has opportunities to provide content to a wide variety of different devices. However, for various reasons, in the past, such content distribution is restricted.

Further, the broadcast networks deliver about 200 to 300 television channels over cable networks, for which, the broadcast network service providers use only about a quarter of the total spectrum available over the broadcast network. The remaining spectrum is unused. If such unused spectrum is utilized, one can deploy many more services on the television set for the user to explore, thereby generating more revenue.

There is therefore felt a need for a cable STB system and architecture thereof which provides a two-way network, allowing real-time interactive, tri-party communication between cable network, cloud based content and the consumer STB, and which will use the said unused spectrum to deploy many more value-added services on the television set, and can be configured to provide content on additional devices like the tablets, mobile devices, and/or personal computers, simultaneously with the television set, through one and the same subscription account.

OBJECTS OF THE INVENTION

An object of the present invention is to provide a cable STB system and a cable STB system architecture thereof, which allows a two-way network, giving real-time interactive, tri-party communication between cable network, cloud based content and the consumer STB, to provide interactive education, entertainment, over-the-top (OTT) services, commercial applications, and the like.

Another object of the present invention is to provide a cable STB system and an architecture thereof which allows a two-way interactive network without any additional capital investment for upgradation of the present cable networks.

Still another object of the present invention is to provide a cable STB system and an architecture thereof which is adapted to deploy a variety of value-added services through the unused spectrum of the broadband networks.

Yet another object of the present invention is to provide a cable STB system and an architecture thereof which can be configured to provide content on additional devices like the tablets, mobile devices, and/or personal computers.

One more object of the present invention is to provide a cable STB system and an architecture thereof adapted to perform consumer profiling for recommending services as per consumer liking and targeted advertisement.

Other aspects, objects and advantages of the present invention will be apparent from the following description.

SUMMARY OF THE INVENTION

In accordance with the present invention, there is disclosed a cable set-top box comprising:
a DVB-C input for receiving a digital video broadcasting cable (DVB-C) signal in the form of a quadrature amplitude modulated transport stream input from a cable headend and transmitting said signal thereof;
a wireless data modem for establishing connectivity by at least one means selected from internet and intranet via a telecommunication network between said cable set-top box and a computing cloud;
an interface for displaying video, voice and data; and
wherein, when a request for an on-demand service or a data is generated at said cable set-top box, said cable set-top box is adapted to perform at least one function selected from: execute said request by extracting data from storage means provided in said cable set-top box, forward said request via said modem to the telecommunication network where the source of said request is identified and routed to corresponding cable headend for execution through at least one means selected from DVB-C and said modem, and forward said request to said modem for transmitting said request generated at said cable set-top box via the telecommunication network to said computing cloud in which the source of said request is identified and routed to corresponding cable headend for execution through at least one means selected from DVB-C and said modem.

Typically, said cable set-top box comprises a high-definition multimedia interface (HDMI) for transferring audio and video data. Further, said cable set-top box comprises a Wi-Fi hotspot for receiving internet data from Ethernet or wireless connectivity for usage at said cable set-top box and re-transmitting said internet data for usage at one or more Wi-Fi enabled devices.

Preferably, said cable set-top box comprises a RF (radio frequency) interface for enabling exchange of data or command with radio frequency based communication devices including remote controls, gaming consoles, telephones, keyboard, and other input/output devices. Additionally, said cable set-top box comprises an infrared interface for enabling exchange of data or command with infrared based devices including remote controls, keyboards, and the like.

Typically, said cable set-top box further comprises an IP telephony interface for exchanging IP voice data, a CVBS output for transmitting analog video signal, a SPDIF output to output optical audio for high-end audio reproduction systems, a hard disk interface, at least one USB port to interface with an external device, an Ethernet interface for connecting said cable set-top box to a network connection, and an optical fiber interface for enabling fiber-to-home connectivity on said cable set-top box.

Additionally, said storage means of said cable set-top box comprise a micro SD for storing content and data.

In accordance with the present invention, there is disclosed a method for delivery of broadcast content, said method comprising the following steps:
requesting an on-demand service or a data through a cable set-top box comprising a wireless data modem for establishing connectivity by at least one means selected from internet and intranet via a telecommunication network between said cable set-top box and a computing cloud; and
receiving said requested on-demand service or data at said cable set-top box by identifying the source of said request via said modem and routing said request to a corresponding cable headend for execution through at least one means selected from DVB-C and said modem.

In accordance with the present invention, said broadcast content comprises broadcast tv, canned content, global channels, local content, T-commerce, in-house applications, educational courses, and the like.

Typically, in accordance with the present invention, said broadcast content is pushed through DVB-C in at least one format selected from file and stream, preferably, in a carousal fashion. Additionally, said method comprises pushing the content through DVB-C using digital storage media command & control (DSM-CC).

In accordance with the present invention, said computing cloud and each cable headend is connected through at least one means selected from an optical fiber, high-speed wireless connectivity, and the like.

In accordance with the present invention, said method comprises sharing said broadcast content in real-time between a central network operations center (NOC) in said computing cloud and said each cable headend. The said NOC typically includes a central database, a subscriber management system, a conditional access system and analytics. Additionally, in accordance with the present invention, a consumer profile is developed at said NOC based on consumer preferences for recommending services and content to the consumer as per his liking. In accordance with the present invention, profiled advertisement can be inserted at a location selected from said NOC, said cable headend, and said cable set-top box for addressing to selective consumers based on at least one criteria selected from geography, demography, socio-economic, consumption pattern, consumer profile, and the like.

Typically, in accordance with the present invention, said method comprises delivering content authentication keys to said cable set-top box from said headend or said NOC via at least one means selected from the telecommunication network and the DVB-C to impart access and authentication at said cable set-top box.

Preferably, in accordance with the present invention, said method comprises providing incremental data from said computing cloud to said cable set-top box via at least one means selected from the telecommunication network and the DVB-C.

In accordance with the present invention, said computing cloud further comprises a service portal. The consumer can access said broadcast content through said service portal using a plurality of other devices including mobile phone, laptop, tablet, ipod, smart phone, personal computer, and the like. Further, a content provider can upload content at said NOC through said service portal. Still further, a service provider can upload geography or demography specific service for a selected region at said NOC through said service portal. Additionally, the consumer can perform one or more activities selected from managing the subscription, recharging the account, and managing the consumer profile, through said service portal.

BRIEF DESCRIPTION OF THE ACCOMPANYING DRAWINGS

The invention will now be described with the help of the following drawings, in which.

DETAILED DESCRIPTION OF THE INVENTION

The embodiments herein and the various features and advantageous details thereof are explained with reference to the non-limiting examples in the following description. The examples used herein are intended merely to facilitate an understanding of the ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Figure 1:
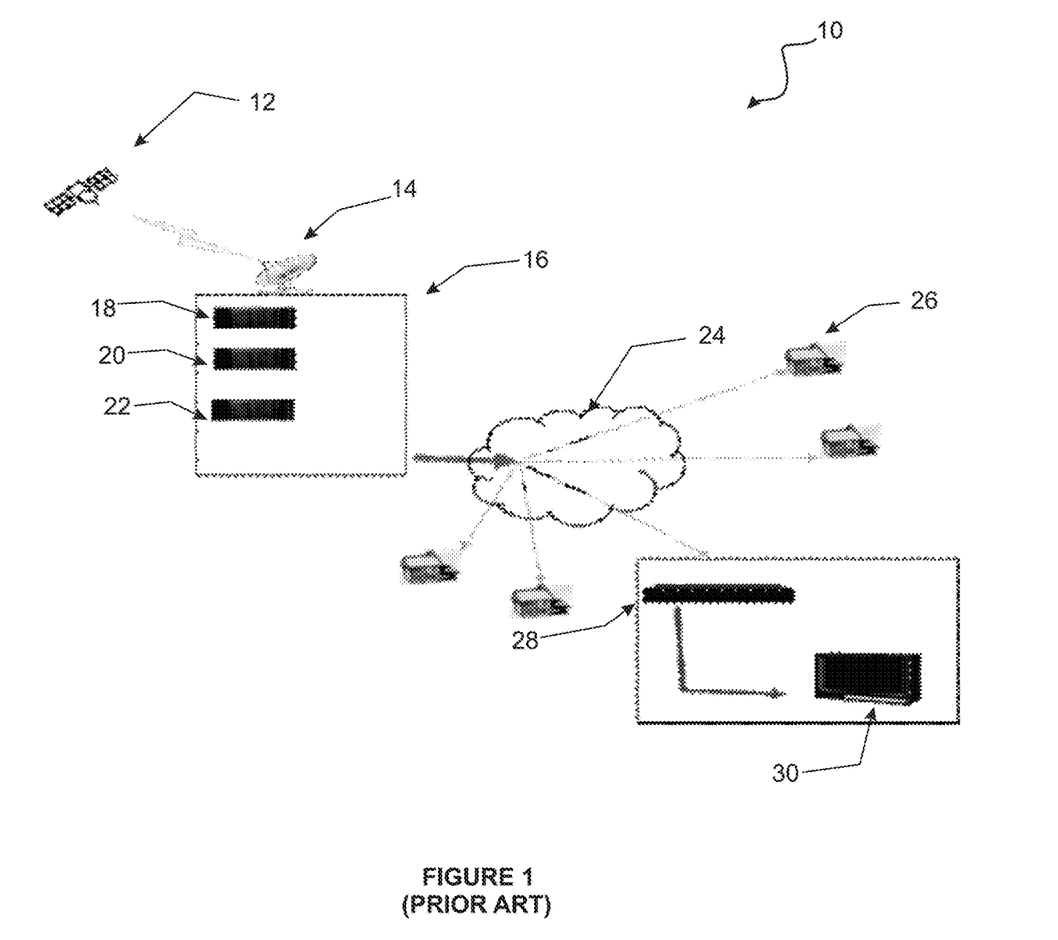
FIG. 1 illustrates a schematic of a typical one-way cable network.

FIG. 1 of the accompanying drawings illustrates a schematic of a typical one-way cable broadcast network, referenced generally in the FIG. 1 by the numeral 10. The network architecture 10 includes a digital broadcast satellite 12, a broadcast signal 14, a digital cable headend 16 comprising a satellite signal reception 18, a Quadrature Amplitude Modulation (QAM) 20, and a Central Authentication Service (CAS) 22, a hybrid fibre coaxial (HFC) multi-system operator (MSO) one-way network 24, and consumer households 26 having the digital STB 28 and the television set 30.

The conventional multi-system operators have a digital RF cable headend 16. The broadcast signal 14 is received from the digital broadcast satellite network 12 at the digital cable headend 16 by means of the satellite signal receivers 18. The broadcast signal 14 is modulated with the digital video broadcasting cable (DVB-C) based QAM 20. This signal 14 is further sent over an HFC network 24 to the households 26. The broadcast networks typically deliver around 200 to 300 television channels over the cable network. For this purpose, the service providers consume only about a quarter of the total available spectrum. The remaining spectrum is unused. This unused spectrum can be used to deploy a variety of value-added services through the television.

Also, the network 10 is purely one-way. That is, the consumers can watch only those programs that are being multi-cast by the service provider. No communication can be established between the television set 30 and the service provider through the STB 28.

Figure 2:
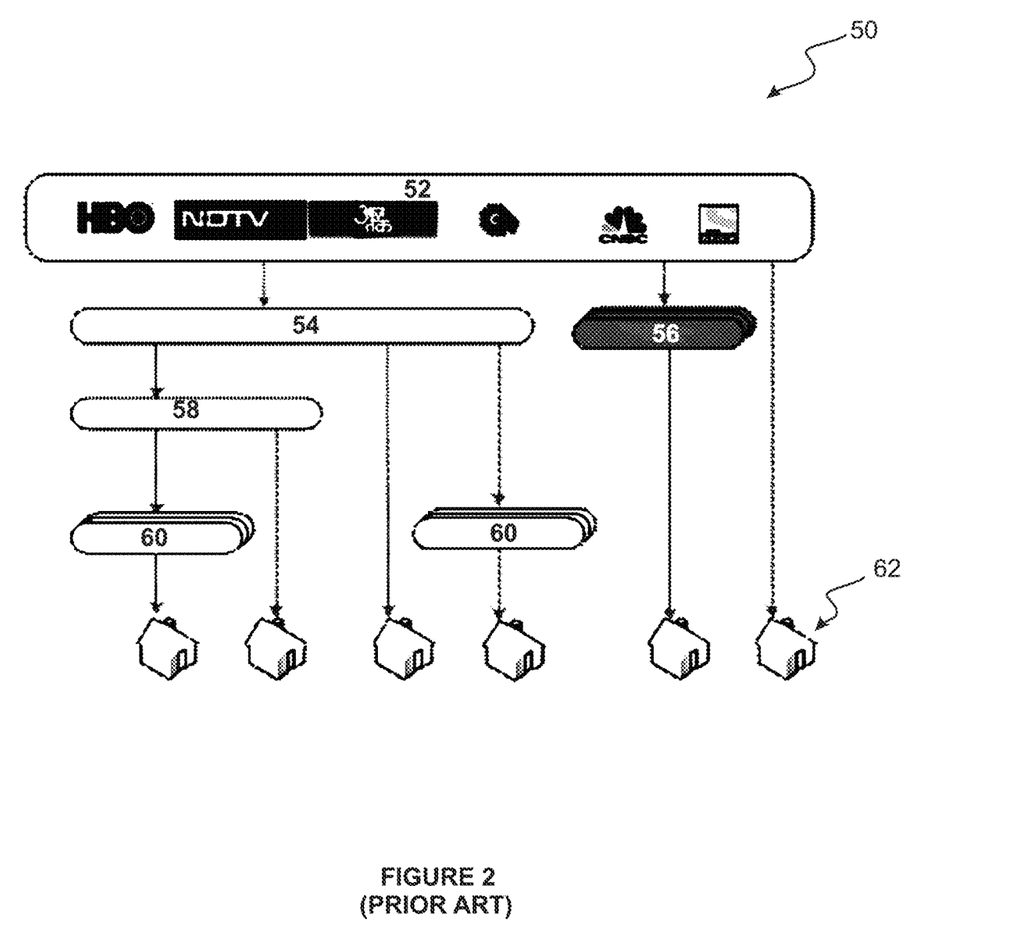
FIG. 2 illustrates a schematic of a typical cable signal distribution.

FIG. 2 of the accompanying drawings illustrates a schematic of a typical cable signal distribution network, referenced generally in the FIG. 2 by numeral 50. In the distribution network 50, multi-system operators (MSO) 54 deploy a broadcast video stream 52 from a cable headend. The cable headend comprises receivers, encoders, modulators, and other miscellaneous signal handling devices. The receivers receive the satellite signal, the encoders encode them in suitable compression format and the modulators modulate them to the Quadrature Amplitude Modulation technique to make the signal suitable for re-transmission over cable. From the MSO 54, the content can be distributed by a distributor 58 through local cable operators (LCO) 60 at a consumer household 62. Alternatively, the broadcast stream 52 can be received at the consumer household 62 through a direct-to-home (DTH) network 56. Optionally, the broadcast stream 52 can be directly distributed at the consumer household 62.

The present invention therefore envisages a novel cable set-top box and a cable distribution architecture thereof which provides a two-way network for allowing real-time interactive, tri-party communication between the cable network, a cloud based content, and the consumer set-top box. The architecture of the present invention is designed to use optimum of the total spectrum available over the broadcast network to deploy many more value-added services on the television set. The value-added services include interactive education, entertainment, over-the-top services, commercial applications, video-on-demand, global channels, local content, in-house applications, and the like. Additionally, the architecture of the present invention includes an interface which is configured to provide the broadcast content streamed to a particular set-top box on alternative devices such as the tablet, laptop, mobile phone, smart phone, personal computer, ipod, and the like.

The present invention provides a two-way interactivity without any additional capital investment. In a country like India, where the infrastructure is already in place, the present invention establishes interactivity without incurring huge capital costs. Deployment of the cable set-top box of the present invention provides the following value-added services, which otherwise could be explored only through different devices, such as—free-to-air broadcast channels, digital pay channel SD/HD, Localized Programming, Commercial insertions, local/region specific advertisement, tele text, FM radio, HDAV (high definition audio video) content, call ahead pay per view, impulse pay per view, personalized advertisements, paging and messaging service, information on demand—schedules and time tables, etc., primary and secondary school education, near-video on demand (NVoD), video on demand, XoD (anything on demand), personal video recorder (PVR), nPVR, customized electronic program guide (EPG), internet access, OTT services, e-commerce and banking, additional subscription driven channels from worldwide networks, social networking, map and location services, localized commercial/information services and web-based applications customized for television.

Figure 3:
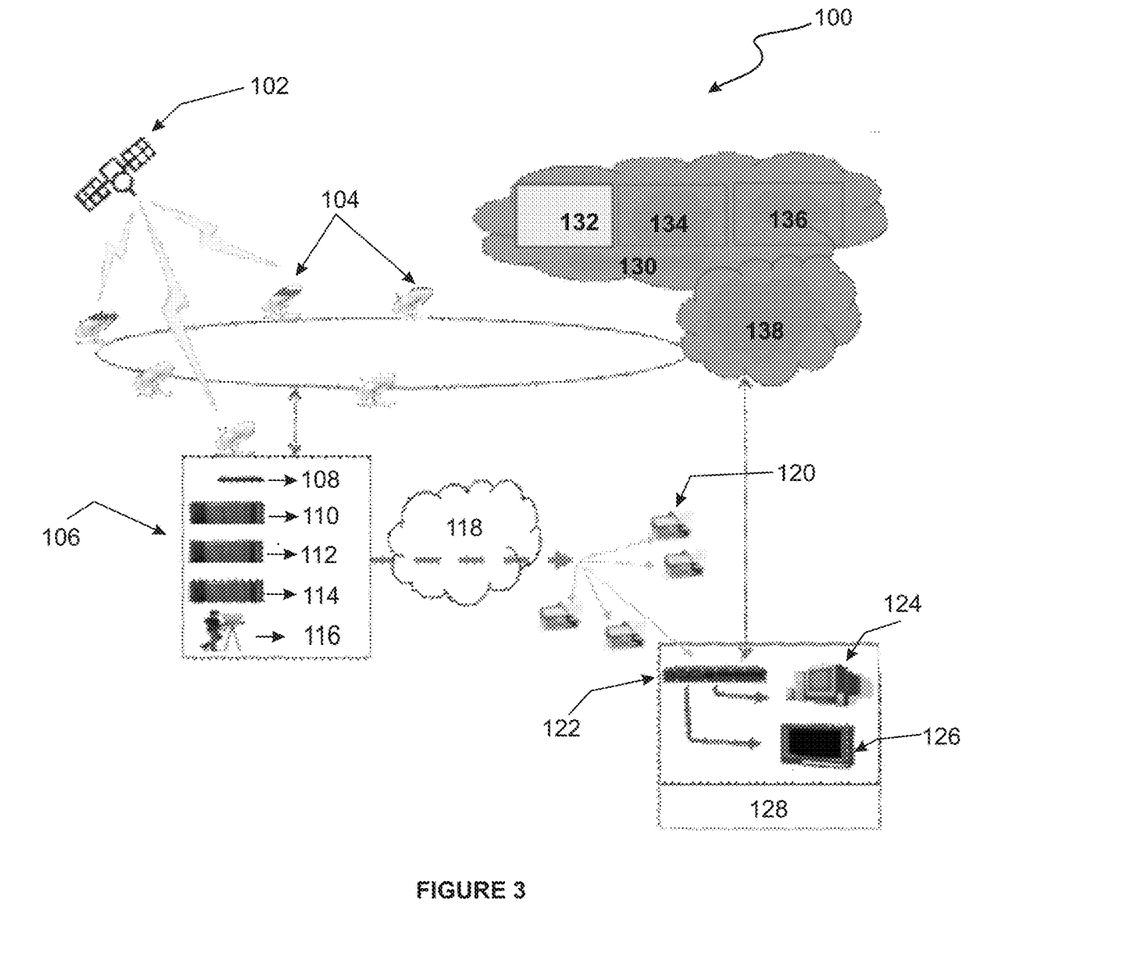
FIG. 3 illustrates a schematic of the cable STB system architecture in accordance with the present invention.

FIG. 3 of the accompanying drawings illustrates a schematic of the cable distribution system architecture in accordance with the present invention, referenced generally in the FIG. 3 by the numeral 100. The cable distribution system architecture 100 includes a digital broadcast satellite 102, a broadcast signal 104 including connectivity through telecommunication networks, a digital cable headend 106 comprising a satellite television 108, a headend automation means 110, internet OTT services 112, stored content 114 and live or playback 116, a hybrid fibre coaxial (HFC) one-way network 118, and consumer households 120 having the cable set-top box 122 and the television set 126, and other devices like personal computer 124 and mobiles or tablets 128. The cable set-top box system 122 is adapted to interact with a computing cloud 130 comprising a central network operations center (NOC) 132, a service portal 134, a cloud database 136, and GPRS/EDGE connectivity & VPN service 138 by means of telecommunication networks.

Using the present invention 100 the architecture of the conventional network 10 is upgraded without majorly altering the existing infrastructure at the headend 106 and without any modification in the distribution system 118. Each cable set-top box system 122 in the cable distribution system 100 is connected to a copper cable, which in turn through a tree-and-branch network architecture is connected to an optical fiber trunk line to cover greater distances. The optical fiber cable is connected to the optical transmitter situated at the cable headend 106. The trunk line works like a main supply line which can drop connectivity at multiple places referred to as nodes. Such networks are called as Hybrid Fiber Cable (HFC) Networks. In smaller networks the optical fiber trunk line is not required and the signal can directly pass through the copper cable. Further, the copper cable may be replaced with another fiber segment which is directly connected to the cable set-top box system 122.

The architecture 100 of the present invention is adapted to push on-demand service, data or broadcast TV over digital video broadcasting cable (DVB-C) in file and/or stream format, typically in a carousal fashion. A digital storage media command & control (DSM-CC) or a customized program for content carousal may be used for pushing the broadcast content.

Most of the content is delivered to the cable set-top box system 122 over DVB-C. Each content asset is transmitted over multicast DVB-C and hence it is available to all the users without exception. In case, multiple consumers choose same content, authentication keys of the same content are provided to each such consumer and they can watch the content of their choice without any glitch. For e.g. many television viewers watch one and the same popular channel at the same time, without any disruption.

The cable set-top box system 122 of the present invention is adapted to provide connectivity by means of a high-speed downlink packet access (HSPDA) modem. The HSPDA modem communicates requests to the cable headend 106 through telecommunication networks. The modem may be adapted to provide a 2G, 3G, 4G or a greater connectivity. Through the modem the cable set-top box system 122 is adapted to establish a connection with the computing cloud 130 to send and receive data. The modem is enabled connectivity by a telecom operator, where via a telecommunication network the connectivity is established. The computing cloud 130 is continually connected to the telecom network.

The telecommunication connectivity plays a very important role in accomplishing the service provision of providing a Close-User-Group (CUG) connectivity to the cable set-top box system 122 and delivery of request from the consumer to the headend 106. The telecommunication network further enables delivery of Content Authentication Keys to the cable set-top box system 122 from the headend 106 and/or the Network Operation Control system 132, imparting access and authentication to the set-top box system 122 as part of the CUG can be configured for session specific connectivity to the computing cloud 130, when the set-top box system 122 accesses the OTT applications, the telecommunication network provides the incremental/refresh data from service portal 134 from cloud 130 to the cable set-top box system 122 directly. The incremental data is then spliced in the local App client provided inside the cable set-top box system 122 and displayed on the television 126. The Content Authentication Keys and the incremental data may be provided through the telecommunication network and/or the DVB-C.

In order to be able to connect multiple headends 106 across various geographies in India, it is advisable to have the central network operations center (NOC) 132 including the central database, subscriber management system, conditional access system (CAS) and analytics, in the cloud 130. The NOC 132 contains the total content available for access by the users. A copy of the content can also be available to all headends 106. Customer viewership profile and audience measurement becomes easy through the NOC 132. Uniform tamplets of applications can be deployed across all the headends 106, maintaining uniform look and feel of the service offering.

The NOC 132 is situated in the computing cloud 130. The NOC 132 is the central control location for all the cable network connections in the distribution system 100 spread across the different locations. The NOC 132 includes a master database that contains encrypted copies of each content asset. Further, the NOC 132 also contains a user authentication, billing, service usage, application and content security data. The NOC 132 of the present invention is therefore adapted to perform one or more of the functions, including: customer authentication, cable set-top box commissioning and provisioning, billing, content encryption and security, database management, maintenance of multiscreen service and content data thereof, maintenance of service portal, customer relationship management, partner (distributor/MSO/LCO) service provisioning and relationship management, advertisement insertion and management, and cable set-top box logistics and control.

The conditional access system and digital rights' management system and their key management servers are adapted to perform the content authentication. The content authentication keys may be provided to the consumer through the modem from the NOC 132 or along with the encrypted content over the DVB-C. The keys are accessible only to the specific cable-set top box connection which has requested such encrypted content through the set-top box or any other alternative compatible device.

The NOC 132 is always connected to each cable headend 106 in the distribution network by means of an optical fiber, high-speed wireless connectivity, etc. A single copy of the content asset added to the content database at the NOC 132 is updated in real-time at every cable headend database. Hence, when a copy of a content asset, application and/or service is inserted at the NOC 132, such content and/or service can be made available across all geographies of the cable distribution network.

While consuming the on-demand services and/or data, a consumer profile is developed and maintained by the NOC 132. Frequent views by a consumer of a particular content, advertisement and/or service assist at developing the consumer profile. This profile is useful for accurate audience measurement and identifying the consumer behavior for recommending to the consumer profiled advertisement and services of his liking.

The service portal 134 in the computing cloud 130 on one hand facilitates access to content, advertisements and local service providers, and on the other hand to the consumers. The service provider can simply login to the portal 134 to upload content, advertisements and services. The portal 134 serves as a single point-of-contact for service providers for using the platform to impart various services to the consumers. The consumers also login into the portal 134 to consume the services and maintain their account. With a powerful enterprise resource planning (ERP) in the back-end, the portal 134 is capable of providing various pertinent reports to the service providers and consumers alike. Besides, the consumers can login to explore the content they have subscribed through the set-top box system 122, at home, or when they are mobile, through mobiles or tablets, or access the same services from a remote location other than their home. For example: a content provider can upload a single copy on the portal 134, select the service parameters and make the content available to the whole of the consumers. Similarly, a local service provider can upload geography or demography specific service, select the service parameters and upload services only for the selected region. The back-end understands the specifics of the provisioning, forwards the service to the specific consumers through designated headend 106, monitors the services provisioning, consumption and creates reports of the same for the respective users of the portal 134. The portal 134 is primarily capable of managing, content, finance, billing and customer relationship.

Figure 4:
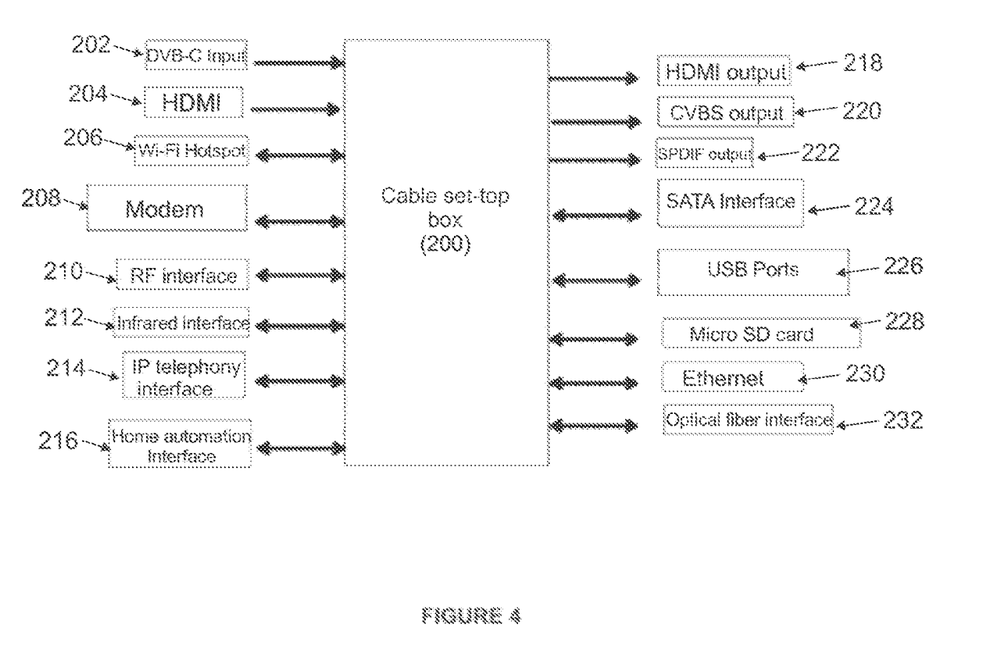
FIG. 4 illustrates an exemplary embodiment of the cable STB system/home gateway in accordance with the present invention.

FIG. 4 of the accompanying drawings illustrates an exemplary embodiment of the cable set-top box in accordance with the present invention, referenced generally in FIG. 4 by the numeral 200. The advanced cable set-top box 200 enables a host of value-added services. The cable set-top box 200 provides an attractive user interface with customer logins, one for a master user and two secondary users for education services. The features/interfaces provided by the cable set-top box 200 comprise television function DVB-C tuning, PVR with embedded multi-media card (EMMC) up-to 32 Gb or more for storage (internal) and a USB port for external storage, Ethernet Interface, Optical Fiber Interface, Catch-Up TV and Live Stream Recording, PUSH VOD, Pay-Per-View (through PUSH VOD mode), Radio-Frequency (RF) interface, Infrared Interface, Wi-Fi hotspot, IP telephony/Voice Interface, Interface for home automation, Conditional Access System (CAS) and Digital Rights Management (DRM) Client, Analytics client, Browser for Internet content access, wireless data modem for connectivity, DVB-C Dual/MultipleTuner Input/High Definition Multi-Media (HDMI) Input, Composite Video (CVBS)/ High Definition Multi-Media Interface (HDMI) Output, Digital Interface Format (S/PDIF) Output, Serial Advanced Technology Attachment (SATA) Interface for external storage, and 2 USB data port.

The cable set-top box (denoted by numeral 200) primarily comprises a wireless data modem (denoted by numeral 208) for allowing high speed data exchange via a telecommunication network by means of Internet or Intranet using 2G/3G/4G connectivity to enable exchange of data or information between the cable set-top box 200 and the computing cloud 130. The cable-set top box 200 comprises a Wi-Fi hotspot (denoted by numeral 206) for receiving internet data from Ethernet or wireless 2G/3G/4G/LTE connectivity for usage at the cable set-top box 200. Further, the Wi-Fi hotspot 206 in the cable set-top box 200 allows re-transmission of the internet data for usage at one or more Wi-Fi enabled devices. The cable set-top box 200 also includes an Ethernet interface (denoted by numeral 230) for enabling connection of the cable set-top box 200 to a network connection for providing connectivity to the internet, intranet and closed-user group for IPTV, 3G, LTE, 4G connectivity.

The cable set-top box 200 includes a DVB-C input (denoted by numeral 202) for receiving a digital video broadcasting cable (DVB-C) signal in the form of a quadrature amplitude modulated transport stream input from a cable headend. The set-top box 200 is further adapted to transmit the signal as output. The cable set-top box 200 includes a high-definition multimedia interface (HDMI) (denoted by numeral 204) for transferring audio and video data. Thus, the cable set-top box 200 is enabled to receive a HDMI input for playback, recording or storage purpose. Simultaneously, the cable set-top box 200 gives a HDMI output (denoted by numeral 218) of an audio or a video that is being played on the in-built player, appearing in the in-built browser and/or a system program generated output. Further, the cable set-top box 200 includes a CVBS output (denoted by numeral 220) for transmitting an analog video signal and a SPDIF output (denoted by numeral 222) to output optical audio for high-end audio reproduction systems. Most television sets have only a composite video baseband signal (CVBS) input. The CVBS output 220 is useful with such television sets and recorders.

The cable set-top box 200 includes a RF interface (denoted by numeral 210) for enabling exchange of data or command between the cable set-top box 200 and radio frequency based communication devices including remote controls, gaming consoles, telephones, keyboard, and other input/output devices. The cable set-top box 200 also includes an infrared interface (denoted by numeral 212) for enabling exchange of data or command between the cable set-top box 200 and the infrared based devices including remote controls, keyboards, and the like.

The cable set-top box 200 is provided with an IP telephony/voice interface (denoted by numeral 214) for exchanging IP voice data. The voice data may be optionally exchanged with an external device connected to the cable set-top box 200 to enable voice communication processed and compiled through the cable set-top box 200.

The cable set-top box 200 is provided with a home automation interface (denoted by numeral 216), where the home automation consoles exchange command and control signals with the cable set-top box 200 through the home automation interface 216. The cable set-top box 200 includes an optical fiber interface (denoted by numeral 232) for enabling fiber-to-home connectivity to the cable set-top box 200 for streaming the value-added services including video, audio and data.

The cable set-top box 200 comprises storage means which include a micro SD card (denoted by numeral 228) for storing the content and/or data. The cable set-top box 200 also includes a serial advanced technology attachment (SATA) interface (denoted by numeral 224) for connecting a hard disk for providing additional storage space for saving content and/or data. The cable set-top box 200 additionally comprises one or more USB ports (denoted by numeral 226) for interfacing with an external device such as a storage device or likewise a smart phone, ipod, and tablet. The modem 208 is connected to the central processing unit through a USB port.

The cable set-top box 200 typically uses Linux as a basic operating system. However, different variants of the cable set-top box 200 can operate on different operating systems such as Linux, Android, or multi-operating systems such as Linux and Android simultaneously.

A set of drivers are provided for various modules of the software which enable integration of the input/output ports/interfaces. The software drivers repurpose the electronic signal suitable for either input module of the processing unit or playing/delivery through the output ports. A middleware is provided to bring about the desired output from the processing unit while processing the input/output signals. The middleware is responsible for providing the features of the cable set-top box 200, where each feature is developed with the help of a dedicated module. For appropriate working of the modem 208, the middleware provides necessary software drivers and PPPP modules. These modules enable modem communication between the cable set-top box and the telecommunication network.

Software applications downloaded at the cable set-top box 200 enable the consumer to use the services offered by the cable set-top box 200. The applications contain the service and transactional data that is exchanged with a backend system to keep track of the customer authentication, authorization, billing and records. The backend system may comprise one or more of the software systems selected from enterprise resource planning, database management system, content security system, conditional access system, digital rights management system, customer relationship management system, network management system, applications, advertisement insertion system, multiscreen control and authentication system, and other ancillary software systems used for the operational control of networks and content transmission. The backend system gathers transactional data either through a client inside the cable set-top box or by analyzing the transactional data received from each cable set-top box.

A user interface, that is a set of small applications written on top of the middleware, enables the consumer to access the various applications, features, and services of the cable set-top box 200. The user interface contains links to all such applications, which on activating run the corresponding application. The present invention provides a specially designed user interface for easy navigation and high quality experience.

A telecom operator is selected to provide the data connectivity via the telecommunication network. The telecom operator classifies all consumers in the cable distribution network in a single group to define a closed-user group for the convenience in billing, service provisioning, etc.

The consumer makes a request for an on-demand service or a data from the cable set-top box 200. A software in the cable set-top box 200 identifies the nature of the request, and further executes the request, if the requested content is saved in the storage means 228 of the cable set-top box 200. If such requested content is not present in the storage means 228 then the cable set-top box 200 is adapted to forward the request to a corresponding cable headend for execution. The request is forwarded via the wireless data modem 208 to the telecommunication network. The source of the request may be identified by the telecommunication network by the customer ID and routed to the corresponding cable headend 106 for execution through DVB-C and/or the modem. Alternatively, the request may be transmitted via the wireless data modem 208 to the telecommunication network for communicating the request to the computing cloud (denoted by numeral 130 in FIG. 3). The source of the request is identified at the computing cloud 130 by the customer ID and routed to the corresponding cable headend 106 for execution through DVB-C and/or the modem. Each cable headend 106 is connected to the central network operations center (NOC) (denoted by numeral 132 in FIG. 3) of the computing cloud 130 by means of a high-speed optical fiber, a wireless link, etc. On identification, the NOC 132 is adapted to route the request to the corresponding cable headend 106.

The cable set-top box 200 primarily receives broadcast television, educational programs, entertainment and radio signals from the cable headend 106. This is multicast to the set-top box 200 over the DVB-C signal in the form of a quadrature amplitude modulated MPEG compressed transport stream. The system data and command data is sent to the set-top box 200 through the Storage Media Command and Control protocol in a regulated manner. A specific software program is written inside the set-top box 200 to push content from the cable headend 106 to the set-top box 200. This program identifies the need of the consumer through the reverse path provided at the set-top box 200 by means of the modem 208.

Also, a communication between the cable set-top box 200 and internet based over-the-top application takes place through the wireless modem 208 connected to the telecommunication network. In a situation where the application entails delivery of large content assets to the consumer as part of service compliance, the service request received through the telecommunication network is passed on to the corresponding cable headend 106. The cable headend 106 identifies the consumer and their specific query and thereby complies the service request.

Figure 5:
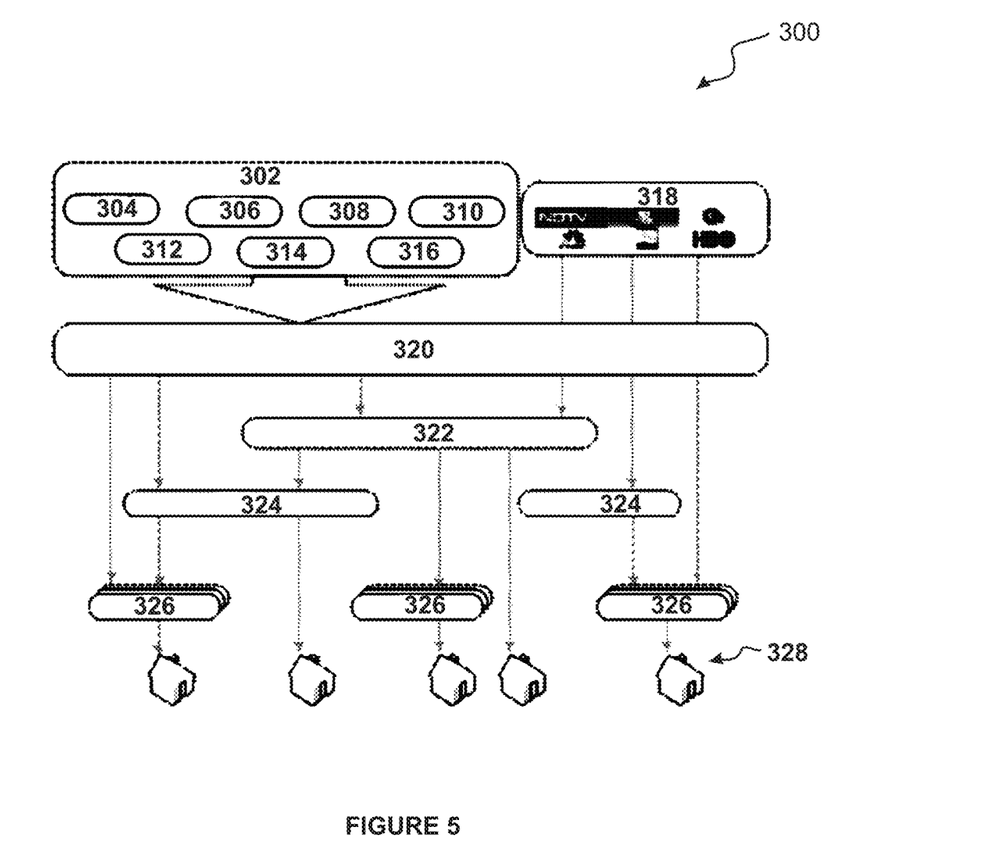
FIG. 5 illustrates an exemplary embodiment of the cable signal distribution network in accordance with the present invention.

Referring to FIG. 5 of the accompanying drawings, therein is illustrated a preferred embodiment of the cable signal distribution network in accordance with the present invention; where the distribution network is generally referenced by the numeral 300 in the FIG. 5. In the distribution network 300 a plurality of modulators are used at the cable headend for transmitting the on-demand content. The plurality of modulators receive a signal from storage command and control protocol servers in the computing cloud 130 and thereby transmit files in the forms of streams, files or carousals. The broadcast TV 318 and the on-demand content 302 are transmitted through a value-added service ecosystem 320 to a multi-system operator (MSO) 322, a distributor 324 or a local cable operator (LCO) 326 to be streamed to a consumer household 328. The MSO 322 may transmit the content to the consumer household 328 directly or through the distributor 324 or the local cable operator 326. The on-demand content 302 may comprise canned content 304, global channels 306, internet data 308, local content 310, t-commerce 312, in-house apps 314, educational content 316, and the like. Only the particular subscriber/consumer who has requested such content receives the on-demand content 302 files or streams. Specific software helps tracking the content delivered to each cable set-top box in the distribution network 300. Upon delivery of the files, the consumer may choose to download or play the subscribed content using an interface.

The cable set-top box 200 can be purchased through a franchise of the company or through a distributor 324, MSO 322 or LCO 326. The cable set-top box 200 and connection thereof can be provided through a company representative. Alternatively, for setting up a new account, a representative of the distributor 324, MSO 322 or LCO 326 may approach the consumer, collect payments and authentication documents, which are uploaded at the NOC 132, and subsequently provide the cable set-top box 200 and connection thereof. The account can also be recharged through a representative of the MSO 322/LCO 326, who will collect the payment and update the account balance instantly.

When a cable set-top box is physically deployed at a customer premise, the LCO 326/MSO 322 representative fills in a customer authentication form (CAF) prescribed by law, which is authenticated by proof of address and other customer identification documents. Electronic copies of these documents are uploaded at the database in the NOC 132.

On completion of the CAF, the box is commissioned at the customer premise. When turned on, the wireless modem 208 latches on to the telecom operators network. It is thus technically possible to identify the location of a particular device connected to the data network operated by the telecom operator by identifying the cell site to which it is latched on. Combination of cell site information and CAF facilitates identifying the exact location of a specific cable set-top box 200.

A comprehensive service portal (denoted by numeral 134 in FIG. 3) facilitates access to each contributor of the ecosystem 320.

A content provider deploying content through the value-added service ecosystem 320 is given a unique secured access to the service portal 134. Through the service portal 134, the content provider can view and record the usage of their content, or the revenue they have accrued through the deployment of their services. The ERP in the back-end facilitates generation of information tables (such as management information service reports), related to the consumption of the content of the content provider through the value-added service ecosystem 320.

The MSO's 322 who deploy the cable set-top boxes 200 in the networks, run and owned by them or their franchises, are provided a unique secured access to the service portal 134. Through the service portal 134 the MSO 322 can view and record consumption of the various services by their consumers, or the revenue they have accrued through the deployment of services in their networks. The ERP in the back-end facilitates generation of information tables (such as management information service reports) related to the consumption of services of the MSO 322 through the value-added service ecosystem 320.

Further, the LCO 326 associated with the MSO 322, who deploy the cable set-top box 200 in networks, run and owned by themselves, are also given a unique secured access to the service portal 134. Through the service portal 134, the LCO 326 can view and record consumption of the various services by the consumers, or the revenue they have accrued through the deployment of services in their networks. The ERP in the back-end facilitates generation of information tables (such as management information service reports) related to the consumption of services through the value-added service ecosystem 320.

The service portal 134 also provides access to advertising agencies. Advertising agencies are contracted to sell the free commercial time during the consumption of the on-demand services, the data or applications. The present invention provides insertion of profiled advertisements at the NOC 132 of the computing cloud 130 through the service portal 134. A copy of the advertisement may also be inserted at the cable headend 106 and the cable set-top box 200. The advertisements can be addressed to selective customers based on at least one criteria selected from geography, demography, socio-economic, consumption pattern, consumer profile, and the like.

The architecture of the present invention is adapted to dynamically insert interactive commercials in the on-demand service, data and applications, subscribed by the consumer. When a consumer exhibits interest in a certain commercial, the data is shared with the corresponding advertiser specific to the geography/demography for direct follow-up with the consumer, thereby assisting effective advertisement and sales.

Additionally, the service portal 134 provides access to the consumer to their accounts. Through the service portal 134 the consumer can perform one or more activities selected from managing the subscription, recharging the account, and managing the consumer profile. All the subscriptions with the cable distribution network are typically pre-paid. The consumer is able to keep track of the subscribed content packages and the account balance at any given point of time, using their television, or an alternative device such as personal computer, laptop, tablet, smart phones, ipod, and the like. In accordance with the present invention, the billing, customer care, customer front end management, etc., are managed by a specifically developed unique ERP software.

The consumer can log-in complaints and generate service requests by accessing the service portal 134. The service request is generated and forwarded to the corresponding MSO 322/LCO 326 for a quick resolution. The consumer can track the progress of their request through the service portal 134. The consumers can conveniently and securely access the subscribed on-demand services or data or service requests using their smart phones, tablets, laptop/computers and the like.

The user interface can be accessed by means of a remote control, keyboard and mouse. The interface is typically developed using programming languages like, C, C++, various graphic scripts/languages and programming libraries. The user experience of accessing the user Interface is maintained uniform across various services, devices, geographies, demographics, applications, etc., across the ecosystem 320.

Technical Advancement

The cable set-top box and cable distribution system architecture for deployment of value-added services over digital video broadcasting-cable, as disclosed here above, has economic significance and several technical advancements including, but not limited to, the realization of:

allows a two-way network, giving real-time interactive, tri-party communication between cable network, cloud based content and the consumer STB, to provide interactive education, entertainment, over-the-top services, commercial applications, and the like;

provides a two-way interactive network without any additional capital investment;

adapted to deploy a variety of value-added services through the unused spectrum of the broadband networks;

can be configured to provide content on additional devices like the tablets, mobile devices, and/or personal computers; and can perform consumer profiling for recommending services as per consumer liking and targeted advertisement.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

Embodiment of the present invention is applicable over a wide number of uses and other embodiments may be developed beyond the embodiment discussed heretofore. Only the most preferred embodiments and their uses have been described herein for purpose of example, illustrating the advantages over the prior art obtained through the present invention; the invention is not limited to these specific embodiments or their specified uses. Thus, the forms of the invention described herein are to be taken as illustrative only and other embodiments may be selected without departing from the scope of the present invention. It should also be understood that additional changes and modifications, within the scope of the invention, will be apparent to one skilled in the art and that various modifications to the construction described herein may fall within the scope of the invention.

The invention claimed is:

1. A system for delivery of on-demand content at a cable multi-tuner set-top box, said system consisting of:
    a cable multi-tuner set-top box including a Digital Video Broadcasting-Cable (DVB-C) input for receiving one-way DVB-C channel, and a modem for establishing connectivity at said cable multi-tuner set-top box;
    a computing cloud configured to communicate bidirectional with said cable multi-tuner set-top box through said modem for enabling a user accessing said cable multi-tuner set-top box to request on-demand content from said computing cloud;
    and a cable headend configured to communicate with said computing cloud through an optical fiber or wireless link, and further configured to communicate with said cable multi-tuner set-top box via a unidirectional hybrid fiber-coaxial (HFC) network;
    wherein, said system is configured to initiate a tri-party communication between said cable multi-tuner set-top box, said computing cloud and said cable headend for authenticating said cable multi-tuner set-top box at said computing cloud or said cable headend, and thereafter routing said on-demand content from said computing cloud to said cable headend for delivery at said cable multi-tuner set-top box over said one-way DVB-C channel via said unidirectional hybrid fiber-coaxial (HFC) network in the form of a quadrature amplitude modulated compressed transport stream.

2. The system as claimed in claim 1, wherein said cable multi-tuner set-top box contains a high-definition multimedia interface, a Wi-Fi hotspot, an RF interface, an infrared interface and IP telephony interface.

3. The system as claimed in claim 1, wherein said cable multi-tuner set-top box contains a CVBS and a S/PDIF output.

4. The system as claimed in claim 1, wherein said cable multi-tuner set-top box contains a hard disk interface operatively connected to at least one tuner of said cable multi-tuner set-top box.

5. The system as claimed in claim 1, wherein said cable multi-tuner set-top box contains an optical fiber interface for enabling fiber-to-home connectivity on said cable multi-tuner set-top box.

6. The system as claimed in claim 1, wherein said system is configured to employ the available spectrum of HFC network for delivering said on-demand content from said cable headend to said cable multi-tuner set-top box.

7. The system as claimed in claim 1, wherein said system is configured to employ a digital storage media command & control (DSM-CC) program for delivery of said on-demand content at said cable multi-tuner set-top box.

8. The system as claimed in claim 1, wherein said cable multi-tuner set-top box contains a high-speed downlink packet access (HSPDA) modem for establishing the connectivity with said computing cloud.

9. A method for delivery of on-demand content at a cable multi-tuner set-top box, said method consisting of:
    requesting on-demand content at said cable multi-tuner set-top box from a computing cloud by establishing a bidirectional connectivity between said cable multi-tuner set-top box and said computing cloud via a modem;
    communicating said on-demand content from said computing cloud to a cable headend where said computing cloud and said cable headend are connected by means of an optical fiber or wireless link;
    forwarding said on-demand content from said cable headend to said cable multi-tuner set-top box via a unidirectional hybrid fiber-coaxial network, where by initiating a tri-party communication between said cable multi-tuner set-top box, said computing cloud and said cable headend, said cable multi-tuner set-top box is authenticated at said computing cloud or said cable headend, and upon successful authentication said on-demand content is delivered at said cable set-top box over one-way DVB-C channel via said unidirectional hybrid fiber-coaxial (HFC) network in the form of a quadrature amplitude modulated compressed transport stream.

10. The method as claimed in claim 9, wherein said on-demand content includes broadcast tv, canned content, global channels, local content, T-commerce, applications and educational courses.

11. The method as claimed in claim 8, said method including pushing said on-demand content over said one-way DVB- C channel using digital storage media command and control (DSM-CC) program.

* * * * *